US009172604B1

(12) United States Patent
Cohn et al.

(10) Patent No.: US 9,172,604 B1
(45) Date of Patent: Oct. 27, 2015

(54) TARGET MAPPING AND IMPLEMENTATION OF ABSTRACT DEVICE MODEL (71) Applicant: Google. Inc., Mountain View, CA (US)

(72) Inventors: Daniel Todd Cohn, Oakland, CA (US); Edward Crabbe, San Francisco, CA (US); Navindra Yadav, Cupertino, CA (US)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 13/776,007

(22) Filed: Feb. 25, 2013

(51) Int. Cl.
*H04L 12/50* (2006.01)
*H04L 12/24* (2006.01)
(52) U.S. Cl.
CPC .................. *H04L 41/0806* (2013.01)
(58) Field of Classification Search
CPC ..................................... H04L 67/104
USPC ........................................ 370/355; 709/223
See application file for complete search history.

(56) References Cited

U.S. PATENT DOCUMENTS

| 6,760,314 | B1 | 7/2004 | Iwata |
| 7,200,674 | B2 | 4/2007 | Sapuram et al. |
| 8,457,945 | B1 | 6/2013 | Fielder et al. |
| 2002/0052927 | A1 | 5/2002 | Park |
| 2002/0075849 | A1 | 6/2002 | Tarle et al. |
| 2002/0141343 | A1 | 10/2002 | Bays |
| 2003/0128700 | A1 | 7/2003 | Bernoth |
| 2004/0008687 | A1 | 1/2004 | Matsubara |
| 2004/0067953 | A1 | 4/2004 | Stein et al. |
| 2004/0246973 | A1 | 12/2004 | Hoang et al. |
| 2005/0125687 | A1 | 6/2005 | Townsend et al. |
| 2006/0078333 | A1 | 4/2006 | Uga et al. |
| 2006/0193266 | A1 | 8/2006 | Siddha et al. |
| 2007/0223397 | A1 | 9/2007 | Gerasimov et al. |
| 2007/0233840 | A1* | 10/2007 | Alstrup et al. ................ 709/223 |

(Continued)

FOREIGN PATENT DOCUMENTS

EP 2 485 143 8/2012

OTHER PUBLICATIONS

Wundsam et al. NOSIX: A Portable Switch Interface for the Network Operating System, TR-12-013, International Computer Science Institute, URL: https://www.icsi.berkeley.edu/pubs/techreports/ICSI_TR-12-013.pdf (Oct. 2012).

(Continued)

*Primary Examiner* — Wanda Z Russell
(74) *Attorney, Agent, or Firm* — Edward A. Gordon; Foley & Lardner LLP (57) ABSTRACT

A Hardware Abstraction Layer (HAL) for a target computing device that is equipped with an Application Specific Integrated Circuit (ASIC) or other hardware element that provides forwarding and/or switching capability is used to analyze an abstract candidate device model. The abstract candidate device model is received from a controller and specifies intended forwarding behavior for the target device. The HAL analyzes the abstract candidate device model based on its knowledge of the architecture of the ASIC or other hardware element providing forwarding or switching capability to the target device. If the behavior is supported by the target device's architecture, the model may be implemented in a specific manner supported by that architecture and used to control forwarding behavior on the target device.

26 Claims, 7 Drawing Sheets

(56) References Cited

U.S. PATENT DOCUMENTS

| | | | | |
|---|---|---|---|---|
| 2007/0274230 | A1* | 11/2007 | Werber et al. ............... | 370/254 |
| 2007/0291754 | A1 | 12/2007 | Okagawa et al. | |
| 2008/0031149 | A1 | 2/2008 | Hughes et al. | |
| 2008/0077382 | A1 | 3/2008 | Strehl | |
| 2008/0083010 | A1 | 4/2008 | Koehler et al. | |
| 2008/0219277 | A1 | 9/2008 | Pratap et al. | |
| 2008/0252518 | A1 | 10/2008 | Yeshayahu | |
| 2008/0301308 | A1 | 12/2008 | Li et al. | |
| 2008/0307240 | A1* | 12/2008 | Dahan et al. ............... | 713/320 |
| 2009/0067331 | A1 | 3/2009 | Watsen et al. | |
| 2009/0172170 | A1 | 7/2009 | Rey | |
| 2009/0249473 | A1 | 10/2009 | Cohn | |
| 2009/0274128 | A1 | 11/2009 | Zhang et al. | |
| 2009/0327514 | A1* | 12/2009 | Foschiano et al. .......... | 709/233 |
| 2012/0033666 | A1 | 2/2012 | Holness et al. | |
| 2012/0093166 | A1 | 4/2012 | Rosenberg et al. | |
| 2012/0323381 | A1 | 12/2012 | Yadav et al. | |
| 2013/0136117 | A1 | 5/2013 | Schrum et al. | |
| 2013/0163427 | A1 | 6/2013 | Beliveau et al. | |
| 2013/0163475 | A1 | 6/2013 | Beliveau et al. | |
| 2013/0238774 | A1* | 9/2013 | Davison et al. ............. | 709/223 |
| 2014/0075498 | A1 | 3/2014 | Porras et al. | |
| 2014/0129687 | A1* | 5/2014 | Halpern ..................... | 709/221 |
| 2014/0146674 | A1* | 5/2014 | Wang et al. ................ | 370/235 |
| 2014/0241348 | A1 | 8/2014 | Yadav et al. | |

OTHER PUBLICATIONS

Beckmann, Curt. Clearing up the Fog around the FAWG, ONF BLOG, URL: https:www.opennetworking.org/?p=373&option=com_wordpress&Itemid=471 (Oct. 18, 2012).

Cohn et al. OF-Futures Primitive Set, Google Docs (http://goo.gl/6qwbg), External Version 0.1 Retrieved from the Internet at URL: https://docs.google.com/document/d/1v_10MCPBZ1RBVVYnleN-2v9Pix0HUCtXPCJKOhwKaRRA/edit?pli=1 (Jul. 1, 2011).

Meyer, David. OpenFlow, Software Defined Networking, and Where its All Going, World Telecommunications Congress 2012, (Mar. 4-7, 2012) Retrieved from the Internet: URL: http://www.ieice.org/—wtc2012/Slides/Workshops/WS2-3/W52-3_2.pdf.

International Search Report and Written Opinion mailed May 28, 2014 in PCT Application No. PCT/US2014/018387.

International Search Report and Written Opinion on Application No. PCT/US2014/018421 dated Jun. 11, 2014.

Rinta-Aho et al. The Click2NetFPGA Toolchain, Proceedings of the 2012 USENIX Conference on Annual Technical Conference, Jun. 13, 2012, URL: https:www.usenix.org/system/files/conference/atc12-final16.pdf.

US Notice of Allowance in U.S. Appl. No. 13/776,001 Dated Sep. 4, 2014.

US Notice of Allowance in U.S. Appl. No. 13/776,026 Dated Jan. 20, 2015.

US Office Action in U.S. Appl. No. 13/597,216 Dated Dec. 31, 2014.
US Office Action in U.S. Appl. No. 13/775,994 Dated Oct. 2, 2014.
US Office Action in U.S. Appl. No. 13/776,012 Dated Oct. 23, 2014.
US Office Action in U.S. Appl. No. 13/776,026 Dated Aug. 26, 2014.
US Office Action in U.S. Appl. No. 13/776,036 Dated Oct. 21, 2014.
US Office Action in U.S. Appl. No. 13/776,036 Dated Mar. 18, 2015.
US Notice of Allowance in U.S. Appl. No. 13/776,036 Dated Jun. 10, 2015.
US Office Action in U.S. Appl. No. 13/597,216 Dated Jul. 16, 2015.

* cited by examiner

TARGET MAPPING AND IMPLEMENTATION OF ABSTRACT DEVICE MODEL

In communication networks, such as telephone networks and data networks including the Internet, information may be sent along a path from a source device to a destination device. The source device and the destination device may be, for example personal computers, servers such as email servers, web servers, or file servers, or other electronic devices capable of sending and/or receiving information via the network.

The information may pass through one or more forwarding devices, such as routers or other electronic devices having the ability to forward the information to another device. The intermediate devices may receive the information and use functions, data structures, and rules to determine where and how to forward the information so that the information moves towards its intended destination. These functions, data structures, and rules form the "forwarding plane" of the network. The functions, data structures, and rules of the forwarding plane may be implemented and/or enforced by one or more forwarding devices in the network.

For example, a forwarding device may receive a packet on an inbound interface, look up the destination address of the packet, and apply a rule which causes the forwarding device to look up the destination address in a particular routing table. The routing table may provide a list of "next destinations" which represent a device to which the packet should be sent. The next destination for a particular packet might be, for example, the final destination device or another intermediate forwarding device. The next destination may be identified by an address stored in the routing table. The next destinations stored in the routing table may be indexed by a final destination of the packet. Thus, by looking up the final destination of the packet (e.g., as identified by a header of the packet), one can retrieve the next destination from the routing table. The forwarding device may then forward the packet on an outbound interface to the identified next destination.

Certain aspects of the forwarding plane can affect the efficiency of the network. These aspects include the specific rules, algorithms, data structures, and functions employed, the manner in which the forwarding plane is implemented, and the location at which the forwarding plane is implemented and/or enforced.

SUMMARY

Embodiments of the present invention utilize a Hardware Abstraction Layer (HAL) for a target computing device that is equipped with an Application Specific Integrated Circuit (ASIC) or other hardware that provides forwarding and/or switching capability such as a Field Programmable Gate Array (FPGA), Application Specific Instruction Set Processor (ASIP), Complex Programmable Logic Device (CPLD), graphics processing unit (GPU), processor or microprocessor. The HAL is used to analyze an abstract candidate device model. The abstract candidate device model is received from a controller and specifies intended forwarding behavior for the target device that the controller desires to have implemented on the target device. The abstract candidate device model indicates what forwarding or switching behavior is desired for the target device rather than providing a device model that tells the target device how to implement the forwarding plane. The HAL analyzes the abstract candidate device model based on its knowledge of the architecture of the ASIC or other hardware element providing forwarding or switching capability to the target device. If the behavior is supported by the target device's architecture, the model may be implemented in a specific manner supported by that architecture and used to control forwarding behavior on the target device.

In an embodiment, a method for implementing an abstract candidate device model that specifies forwarding or switching behavior on a target computing device includes receiving, from a controller, an abstract candidate device model. The abstract candidate device model describes intended packet forwarding or switching behavior for the target computing device. The abstract candidate device model is received with a Hardware Abstraction Layer (HAL) for the target computing device. The method further maps with the HAL the abstract candidate device model to an existing architecture of the target computing device to determine the intended packet forwarding or switching behavior that is supported by the target computing device. The architecture of the target computing device includes at least one of an Application Specific Integrated Circuit (ASIC), Field Programmable Gate Array (FPGA), Application Specific Instruction Set Processor (ASIP), Complex Programmable Logic Device (CPLD), graphics processing unit (GPU), processor or microprocessor. The method then implements on the target computing device the supported behavior determined from the mapping of the abstract candidate device model.

In another embodiment, a target computing device with forwarding and switching capability includes a Hardware Abstraction Layer (HAL) and a local Application Specific Integrated Circuit (ASIC). The target computing device is configured to receive, from a controller, an abstract candidate device model describing intended packet forwarding or switching behavior for the target computing device. The abstract candidate device model is received with the HAL. The target computing device is further configured to map with the HAL the abstract candidate device model to an existing architecture of the target computing device/ASIC to determine which of the intended packet forwarding or switching behavior is supported by the target computing device. The target computing device is also configured to implement the supported behavior from the abstract candidate device model on the target computing device.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Conventional Software Defined Networking (SDN) approaches to creating a forwarding plane interface abstraction that can be used to implement forwarding behavior on a target device for handling SDN applications have failed to fully take advantage of the architecture provided by the target switch or other forwarding device. For example, conventional approaches like those utilized by OpenFlow and ForCES have attempted to provide an abstraction of the interface so that a universal programmable data path abstraction may be used that does not require vendors to expose proprietary information or vendor-specific control software to be written. Thus, in OpenFlow, a model provides a set of tables that each include "flow entries" and a set of action lists which are actions to performed if a packet being processed matches a flow entry. Unfortunately the simple abstraction of setting the forwarding table entries loses too much information about the application developer's intent thereby making it difficult or impossible to properly leverage the features of the target device when the model is being processed. Additionally OpenFlow allows a controller to query a target device and the responses received from the target device regarding its capabilities may inadvertently "leak" information the device vendor wishes to keep confidential. Further, the OpenFlow model makes a number of assumptions regarding table usage and pipeline design that frequently fail to reflect actual design of a network Application Specific Integrated Circuit (ASIC) provided on the target device. For example, tables on an ASIC may be replicated or shared and parallel pipelines may be utilized and OpenFlow and similar approaches fail to properly account for these design considerations.

Figure 1:
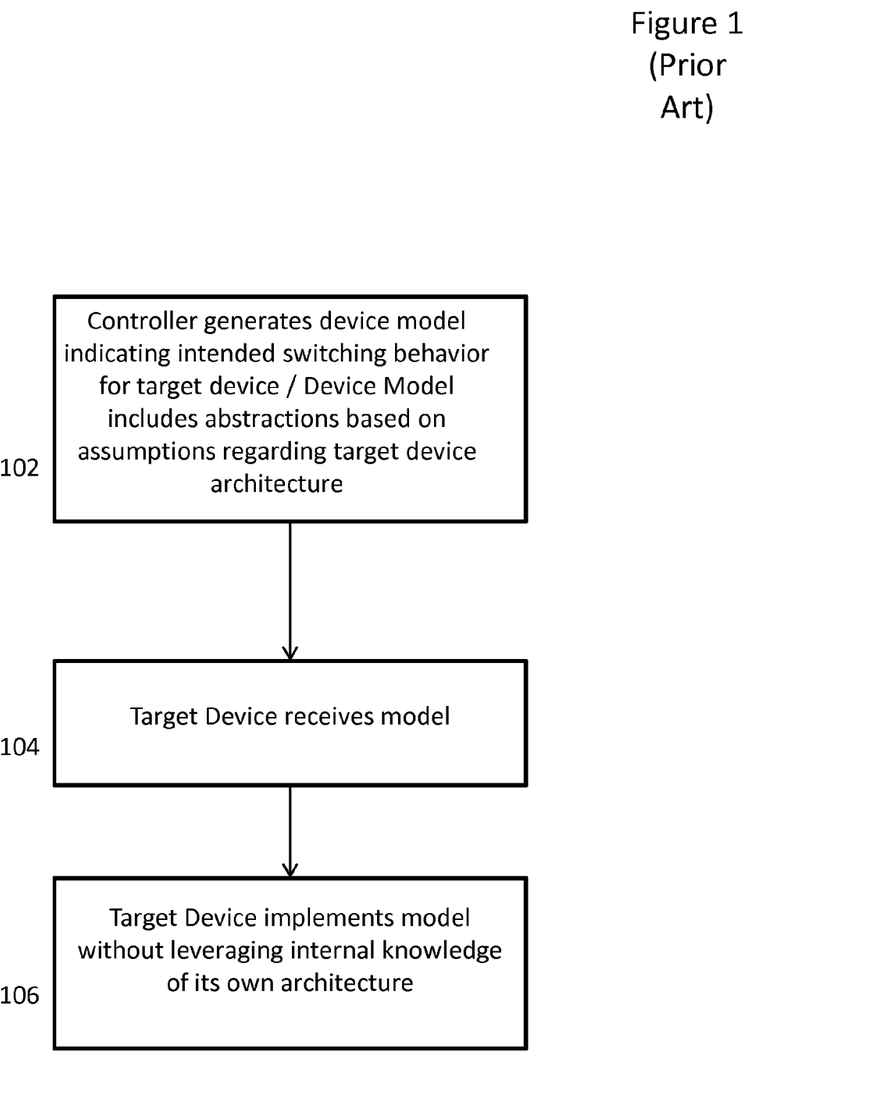
FIG. 1 (prior art) depicts a conventional sequence of a controller building and forwarding a functional device model to a target device.

FIG. 1 (prior art) depicts an exemplary conventional sequence of a controller building and forwarding a functional device model to a target device. The exemplary sequence begins with a controller generating a device model intended for implementation on the target device (step 102). The model created by the controller defines forwarding behavior to be implemented on the target device but includes abstractions based on assumptions of the target device capabilities. The target device receives the model (step 104) and implements the forwarding behavior from the model on the target device (to the degree it can). This implementation is based on the defined behavior in the model and does not leverage the full extent of the target device's internal knowledge of its own architecture (step 106).

Embodiments of the present invention depart from this conventional approach and utilize an abstract candidate (target) device model constructed in a universal language that specifies intended forwarding or switching behavior that a controller desires to have implemented on a target device. Put another way, the embodiments of the present invention focus more on defining "what" forwarding behavior is to be implemented by the target device rather than defining "how" the forwarding behavior is to be implemented. The abstract candidate device model specifying the forwarding behavior is transmitted by a controller to a hardware abstraction layer (HAL) for a target device that has forwarding or switching capability (as used hereafter in this description, the term "forwarding behavior" should be understood to include packet processing that is performed using either L2 or L3 address information). The HAL translates and analyzes the model. In one embodiment the intended forwarding behavior may be listed in the abstract candidate device model as mandatory behavior that must be supported by the target device and non-mandatory behavior that is optionally supported. The HAL maps the abstract candidate device model to the target device's architecture and thereby utilizes its knowledge of the target device's architecture to identify what portion if any of the intended behavior listed in the abstract candidate device model is supported by the target device. The HAL then informs the controller of how much of the intended behavior is supported. Embodiments also may provide for additional forwarding behavior for the abstract candidate device model to be proposed by either the controller or HAL. Once the negotiation between the HAL and controller is complete, and the supported behavior is acceptable to the controller, the HAL assists in the implementation of the negotiated model on the target device by acting as a translator to the target device hardware and providing configuration to the hardware to allow the data it translates to perform appropriate tasks. For example, the HAL may set configuration registers, or in the case of a FPGA or CPU, may send microcode or software to the target processor.

Figure 2:
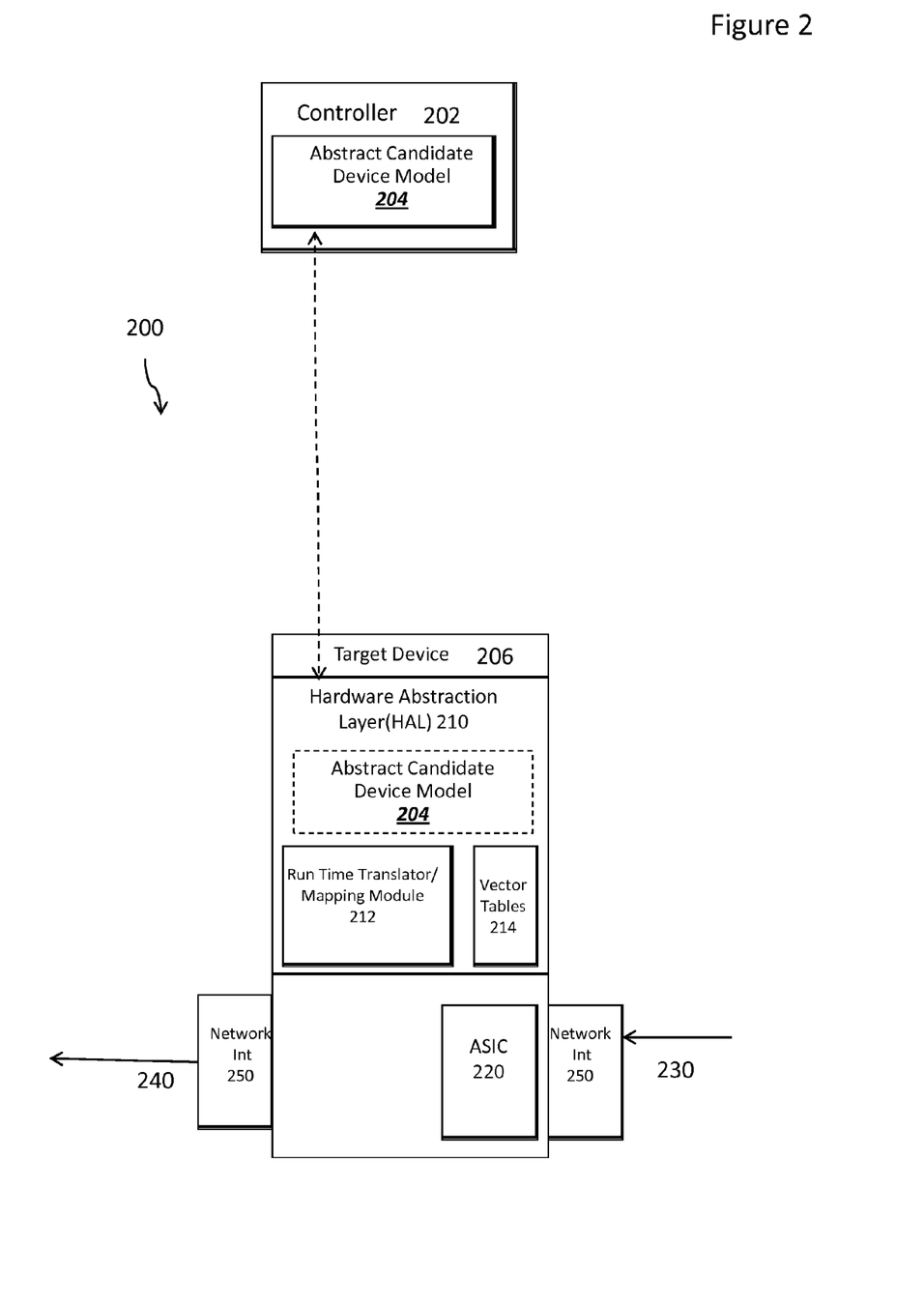
FIG. 2 depicts an exemplary environment in which a controller and target device interact in an exemplary embodiment.

FIG. 2 depicts an exemplary environment in which a controller and target device interact in an exemplary embodiment. The controller 202 constructs an abstract candidate device model 204 which is forwarded to a target device 206 that has forwarding or switching capability. For example, the target device 206 may be a switch that receives input packets 230, processes the packets based on defined forwarding behavior using ASIC 220, and outputs the packets 240 based on the processing. As explained further below, the abstract candidate device model 204 is constructed in a universal language from network primitives defining desired functionality. The target device includes a Hardware Abstraction Layer (HAL) 210 that receives the abstract candidate device model 204. For example, the HAL may implement a listener to receive the abstract candidate device model. The HAL 210 may include a run-time translator/mapping module 212 and vector tables 214. The run-time translator/mapping module 212 translates the abstract candidate device model 204 and maps the intended behavior that is supported to the capabilities of the target device using vector tables 216. For example, the mapping may be based on the architecture and capabilities of the ASIC 220. In one embodiment the HAL 210 may also include a "human in the loop" to assist in the analysis. Following a negotiation (described further below) between the controller 202 and the HAL 210, the agreed upon model is pushed to the ASIC or other target device hardware for implementation. The negotiated model assigns handles to vector tables that can then be programmed via a mechanism similar to OpenFlow's FlowMod at runtime.

It should be appreciated that the target device may include other hardware elements other than or in addition to an ASIC that have forwarding or switching capability and that the HAL may map the intended behavior to these other hardware elements. For example, the target device may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processors may include a single core or multiple cores. Moreover, the processors may include a system-on-chip (SoC) or system-in-package (SiP). The description contained herein that for ease of description refers only to an ASIC should therefore also be read as applying to other hardware elements in the target device that provide forwarding or switching capability to the target device.

The abstract candidate device model 204 created by the controller represents the behavior expected by the controller's applications. The abstract candidate device model is described in terms of a universal language composed of functions made up of 'network primitives'. These functions describe a parse tree, abstract tables and their desired characteristics, and any lookups or data transforms to be performed in the datapath. The network primitives may describe what actions are to be performed but typically will not include the requirements for carrying out those actions as those implementation details are left to the HAL for the target device to define based on the target device's architecture. The network primitives form an Intermediate Representation-like instruction set and are flexible enough to describe most intended forwarding behaviors. The universal language employed by the embodiments is a target-independent language that can be interpreted by recipient devices.

In a created device model of an embodiment, the flow of operations between primitive functions operates on a per-packet basis and is expressed in terms of producer/consumer relationships assigned to each functional block. When a functional block is used in a model it may declare which named 'handles' it consumes and which 'handles' it produces. The functional blocks are not executed until all of the handles they consume have been produced elsewhere. Accordingly, the only ordering enforced is based on required information for a following step being available, regardless of how a target ASIC/device is laid out. Functional blocks may be used to tie together network primitives in the model into a meaningful execution context. The functional blocks, which contain one or more primitives, may begin with a list of consumed handles and end with a list of produced handles to facilitate the flow of operations described above.

Figure 3:
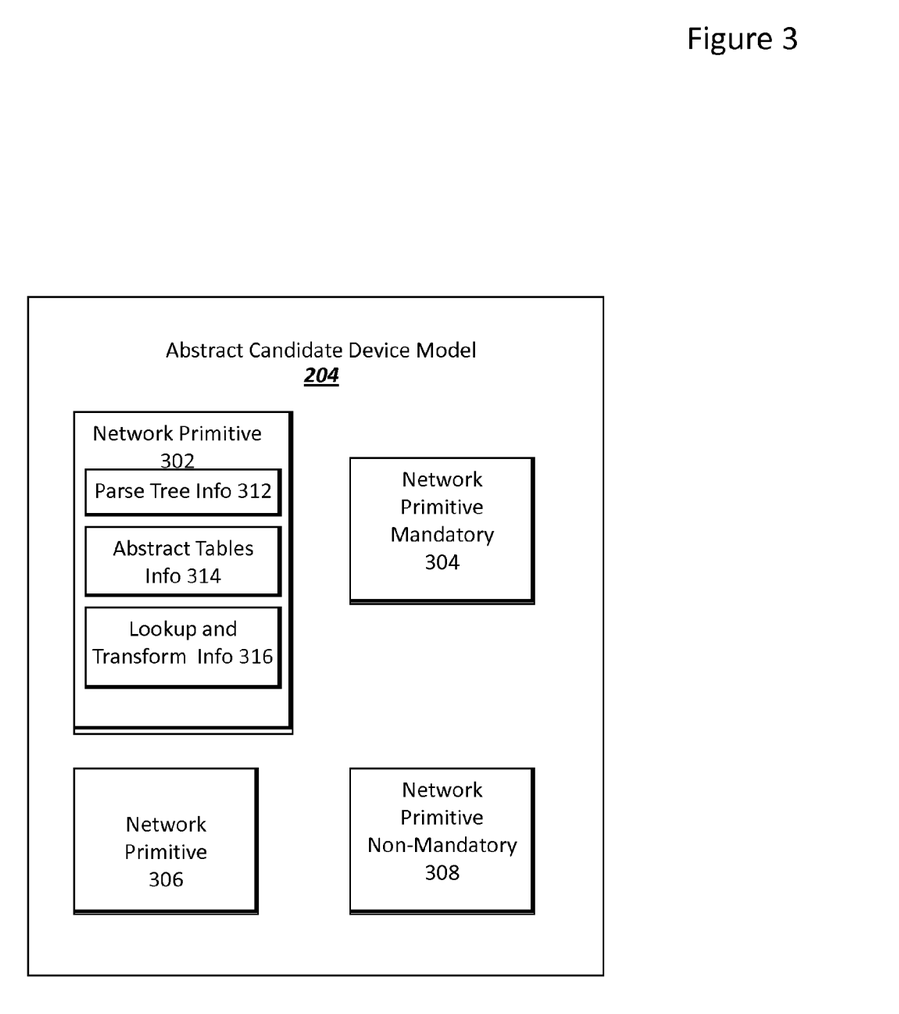
FIG. 3 depicts an exemplary abstract candidate device model in an exemplary embodiment.

FIG. 3 depicts an exemplary abstract candidate device model in an exemplary embodiment. For example, abstract candidate device model 204, may include network primitives 302, 304, 306, and 308. As depicted for network primitive 302, each of the network primitives in the abstract candidate device model may include parse tree information 312 used to describe a parse tree, abstract table information 314 and lookup and transform information 316. It will be appreciated that the number of network primitives in the abstract candidate device model will vary depending upon the specifics of the model. In one embodiment, each of the functions/network primitives may be marked, for example with a flag, as mandatory behavior that must be supported by any target device implementing the model or as non-mandatory behavior that is optional to support. For example, network primitive 304 may be marked as mandatory behavior while network primitive 308 may be marked as non-mandatory behavior. In an alternative embodiment only the mandatory behavior, or only the non-mandatory behavior, may be so marked by the controller in the model and the HAL configured to process the unmarked functions/network primitives as they were marked as the inverse of the marked behavior (i.e. if only mandatory behavior is marked, any non-marked behavior is interpreted as non-mandatory, etc.).

Figure 4:
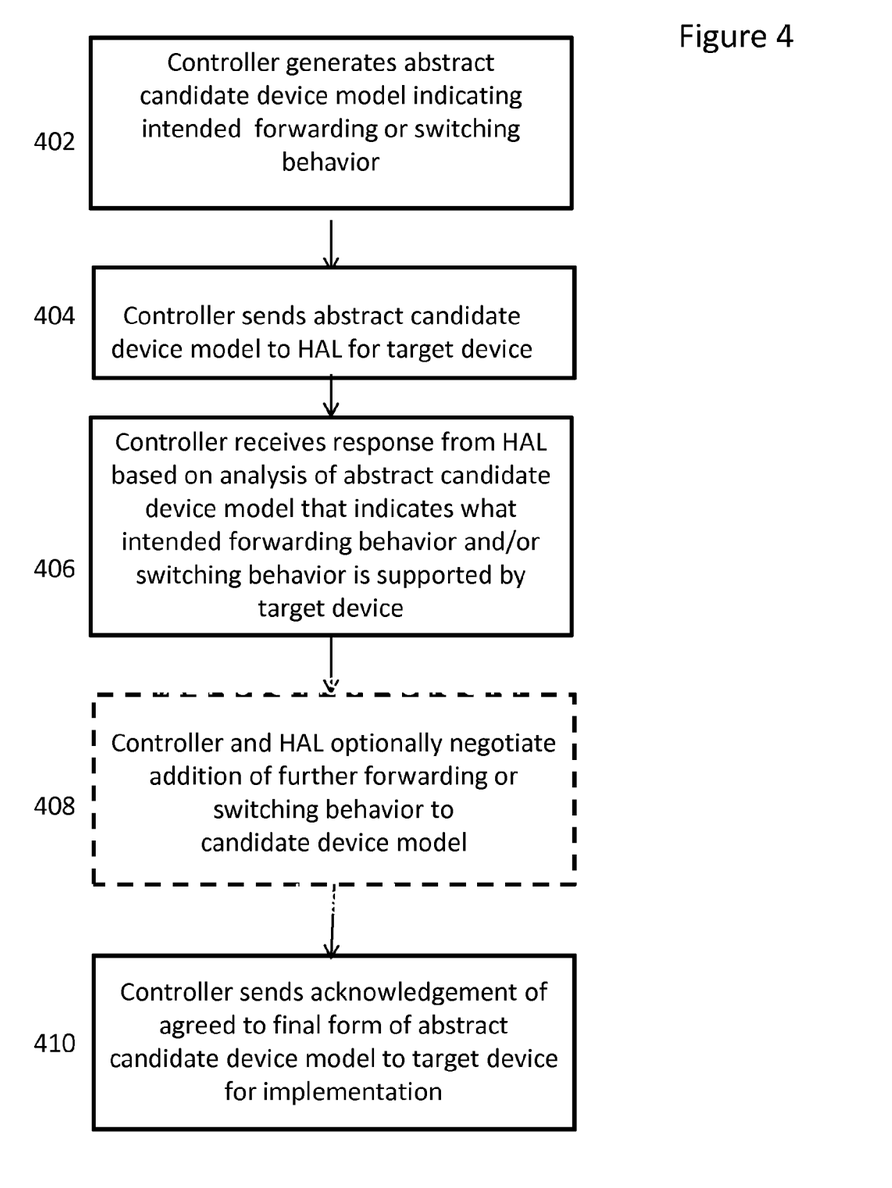
FIG. 4 depicts an exemplary sequence of steps followed by a controller in an exemplary embodiment to provide an abstract candidate device model.

FIG. 4 depicts an exemplary sequence of steps followed by a controller in an exemplary embodiment to provide an abstract candidate device model to a target device. The exemplary sequence begins when a controller generates an abstract candidate device model that indicates intended forwarded behavior (step 402). In one embodiment, the intended forwarding behaviors are respectively marked as mandatory or non-mandatory. The controller sends the abstract candidate device model to a HAL for a target device (step 404). The controller then receives a response from the HAL indicating which behaviors are supported by the targeting device (step 406). For example, based on the analysis performed by the HAL, the response may indicate that all of the intended forwarding behaviors are supported by the target device or only a subset of the behaviors are supported by the target device. Alternatively, in situations where the intended forwarding behaviors were marked as mandatory and non-mandatory, the response may indicate that only the mandatory behaviors are supported by the target device. The response may also indicate that the mandatory behaviors and some but less than all (or all) of the optional non-mandatory behaviors are supported. Of course, the response may also indicate that the mandatory behaviors are not supported by the target device.

Following the initial response, the controller and HAL may optionally negotiate the addition of further forwarding behavior to the abstract candidate device model (step 408). The controller may propose additional behavior which will be analyzed by the HAL in light of its knowledge of the target device's architecture, for example, based on its knowledge of its local ASIC architecture. The controller then receives a response from the HAL indicating whether the additional behavior is supported. Alternatively, the HAL may propose a subset or reorganization of the intended forwarding behavior originally proposed by the controller and supported by the target device. In such a case no further analysis of the subset or reorganization of the intended behavior is necessary as the HAL already is aware of whether the behavior is supported by the target device and the controller need only agree or disagree to its inclusion in the model. Once the supported behavior has all been reported to the controller, the controller may agree or disagree as to the implementation of a model with the supported behavior. If the controller agrees, an acknowledgement is sent to the HAL agreeing to the final form of the abstract candidate device model. The acknowledgement serves as a trigger for the HAL to proceed with the implementation of the behavior in the final form of the model on the target device (step 410). It will be appreciated that the sequence of actions may vary from the above-described sequence without departing from the scope of the present invention. For example, the HAL's initial response as to whether the abstract candidate device model behavior is supported may also include a proposal for the inclusion of a subset or reorganization of the intended forwarding behaviors.

Figure 5:
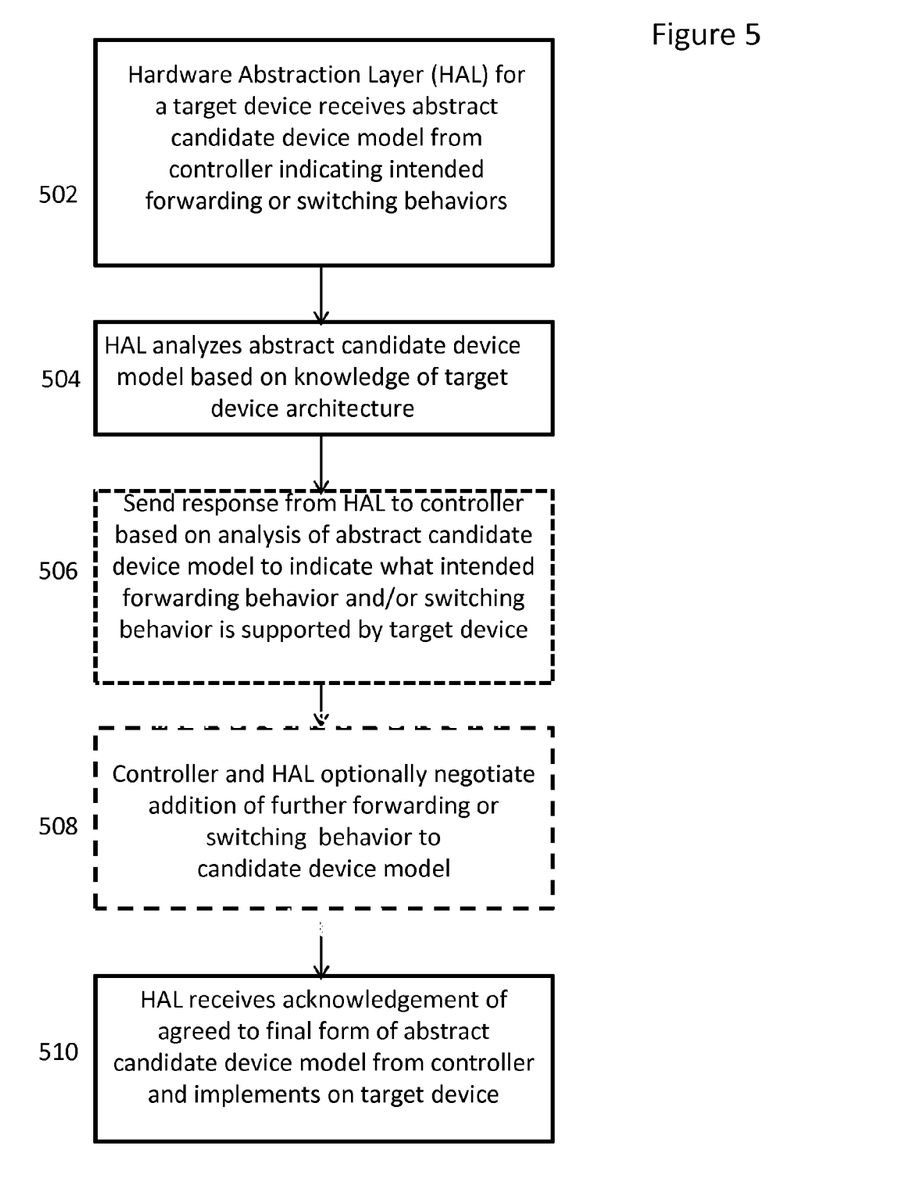
FIG. 5 depicts an exemplary sequence of steps followed by a target computing device in an exemplary embodiment to implement supported behavior from an abstract candidate device model.

In embodiments of the present invention, the HAL is responsible for analyzing what intended forwarding behaviors in the abstract candidate device model are supported by the target device and also overseeing the implementation of the forwarding behaviors contained in the final form of the negotiated model on the target device. FIG. 5 depicts an exemplary sequence of steps followed by a HAL for a target computing device in an embodiment to implement supported behavior from an abstract candidate device model. The sequence begins when the HAL for a target device receives an abstract candidate device model from a controller that indicates intended forwarding behaviors (step 502). The HAL analyzes the abstract candidate device model to determine which of the intended forwarding behaviors are supported on the target device. The analysis is based on its knowledge of the target device's architecture including, for example, the HAL's knowledge of an ASIC architecture on the target device (step 504). A response may then be sent from the HAL to the controller informing the controller of which of the intended forwarding behaviors is supported by the target device (step 506). As discussed above, the controller and HAL may optionally negotiate the inclusion of further forwarding behaviors for inclusion in the abstract candidate device model (step 508). For example, the controller may propose additional behaviors based on the initial response and the HAL may propose a subset or reorganization of the intended forwarding behaviors. The HAL then receives an acknowledgement of the final form of the abstract candidate device model from the controller, maps the behaviors contained in the final form of the model into vector tables appropriate for the target device, and pushes the model to the ASIC/target device for implementation (step 510).

It should be appreciated that other alternatives exist to the sequence of steps depicted in FIG. 5 that are also within the scope of the present invention. For example, in one embodiment, the HAL may receive the abstract candidate device model and analyze it to determine the supported behaviors as set forth above without further interaction with the controller. In such a scenario, the controller would not be required to "sign off" on the final form of the model.

The HAL's knowledge of the target device architecture allows the forwarding behaviors in the final model to be implemented using the most efficient techniques available on a target device. For example, in an embodiment, a local ASIC's architecture may allow for the forwarding behaviors to implemented using pipeline re-ordering and/or the use of parallel pipelines. Similarly, the forwarding behaviors may be implemented on the target computing device through the use of metering, packet fragmentation, packet reassembly, header insertion or removal, Network Address Translation (NAT) and/or cryptography.

Portions or all of the embodiments of the present invention may be provided as one or more computer-readable programs or code embodied on or in one or more non-transitory mediums. The mediums may be, but are not limited to, a hard disk, a compact disc, a digital versatile disc, ROM, PROM, EPROM, EEPROM, Flash memory, a RAM, or a magnetic tape. In general, the computer-readable programs or code may be implemented in any computing language. The computer-executable instructions may be stored on one or more non-transitory computer readable media.

Figure 6:
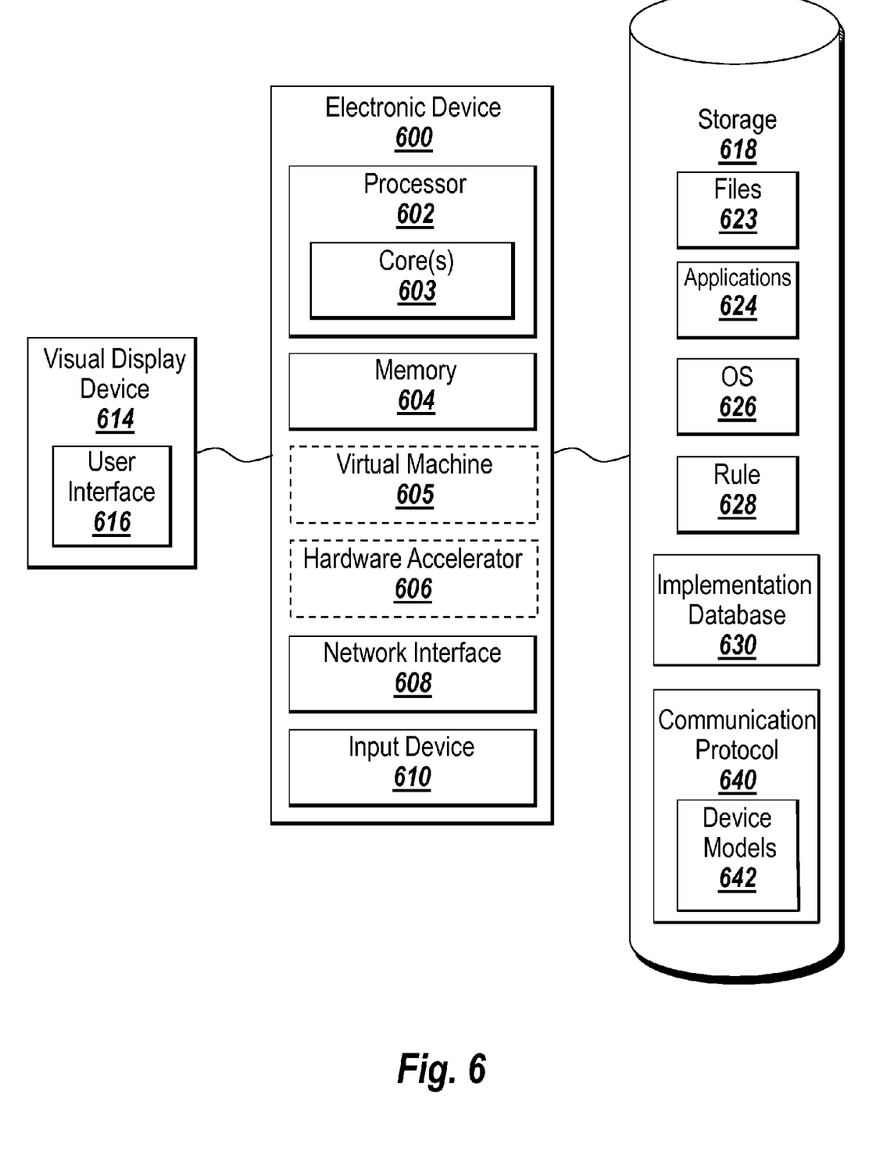
FIG. 6 depicts an exemplary environment suitable for practicing an embodiment of the present invention.

One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices. The electronic device 600 may also include Content Addressable Memory (CAM) and Ternary Content Addressable Memory (TCAM).

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. The electronic device 600 may also include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further include rules 628 which describe how messages should be forwarded in a communications network. The rules 628 may be used to forward messages or information received at the electronic device 628. Accordingly, the electronic device 600 may serve as a forwarding device, switch, or router.

The storage device 618 may store an implementation database 630. The implementation database 630 may be a data structure, such as a table or matrix, which stores identifiers identifying predetermined functions that are implemented by the electronic device 630. The implementation database may further store the implementation details of the predetermined functions.

The storage device 618 may further include logic for implementing a communications protocol 640. The communications protocol 640 may be a protocol which provides an interface for accessing and modifying the functionality of the forwarding plane of the electronic device 600. Exemplary communications protocols 640 include, but are not limited to, the OpenFlow protocol (see, e.g., McKeown, Nick et al., "OpenFlow: Enabling Innovation in Campus Networks," ACM SIGCOMM Computer Communication Review Archive, vol. 38 issue 2, pp. 69-74 (April 2008), the contents of which are incorporated herein by reference) or custom communications protocols. Thus, the electronic device 600 may serve as a remote controller, such as the controller 202 described above with respect to FIG. 2.

The communications protocol 640 may allow the details of the forwarding plane implemented by the electronic device 600 to be defined and/or modified. Accordingly, the communications protocol 640 allows a communications network to be made programmable.

The communications protocol 640 may support the use of one or more device models 642 to describe the functionality of the forwarding plane. A device model 642 may be an abstract candidate device model and represent the complete set of network routing functionality to be implemented by the electronic device 640. For example, the device model 642 may define the functionality and performance of the forwarding plane.

The device model 642 may include one or more network primitives as described above.

Figure 7:
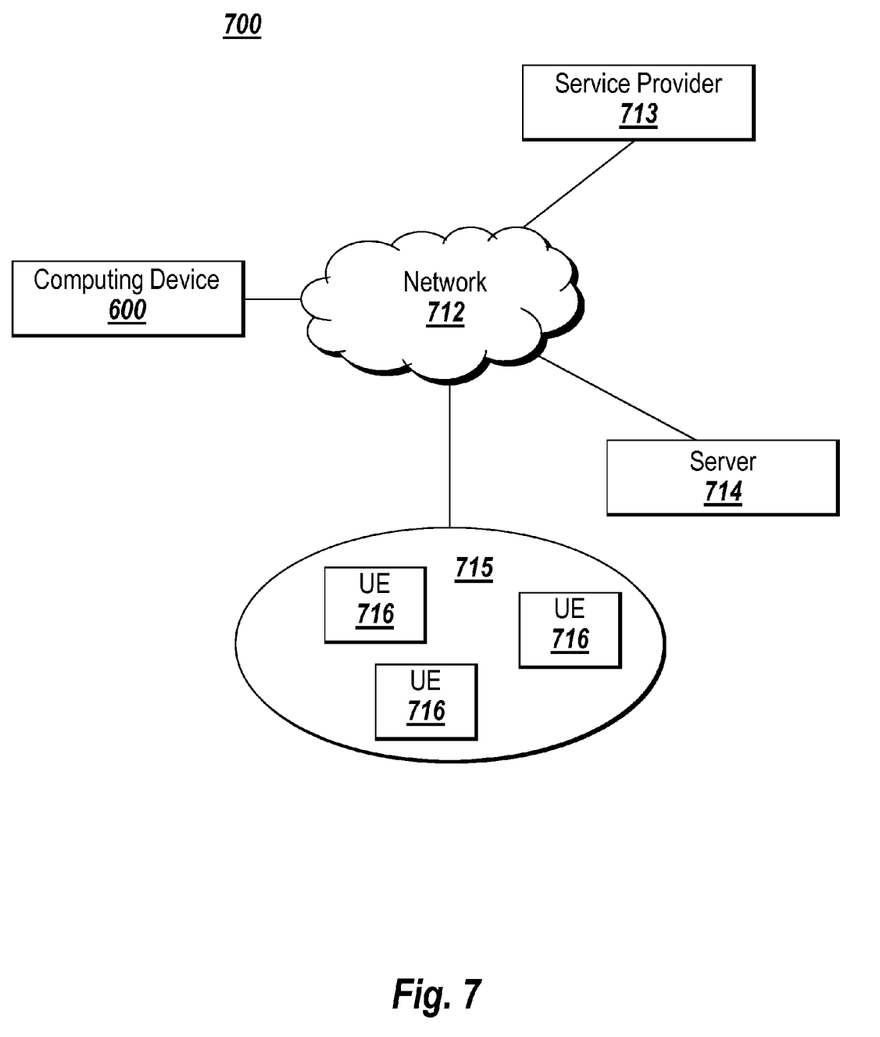
FIG. 7 depicts an exemplary network environment suitable for practicing an embodiment of the present invention.

FIG. 7 depicts an exemplary network implementation that may implement one or more embodiments of the invention. A system 700 may include a computing device 600, a network 712, a service provider 713, a server 714, and a cluster 715.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware. Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 500 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 500 on a subscription basis (e.g., via a web service).

Units of Execution (UEs) may provide remote/distributed processing capabilities for the applications 624 and may be hardware or software units of execution. The UEs may include a device (e.g., a hardware resource) that may perform and/or participate in parallel programming activities. A hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory storage medium holding computing-device readable instructions that, when executed by one or more processors, cause a target computing device having forwarding or switching capability to:
   receive, from a controller, by a Hardware Abstraction Layer (HAL) for the target computing device, an abstract candidate device model describing intended packet forwarding or switching behavior for the target computing device;
   map, by the HAL, the abstract candidate device model to an existing architecture of the target computing device, the architecture of the target computing device including at least one of an Application Specific Integrated Circuit (ASIC), Field Programmable Gate Array (FPGA), Application Specific Instruction Set Processor (ASIP), Complex Programmable Logic Device (CPLD), graphics processing unit (GPU), processor or microprocessor;
   determine, by the HAL, which of the intended packet forwarding or switching behavior is supported by the target computing device;
   send a response to the controller indicating what behavior is supported by the target computing device; and
   implement the supported behavior from the abstract candidate device model on the target computing device.

2. The medium of claim 1 wherein the target computing device is a switch.

3. The medium of claim 1 wherein the implementation of the supported behavior assigns handles to vector tables on the target computing device so that the vector tables are programmable by the controller at runtime.

4. The medium of claim 1 wherein the target computing device implements the supported behavior using parallelism.

5. The medium of claim 1 wherein the target computing device implements the supported behavior using pipeline re-ordering.

6. The medium of claim 1 wherein the target computing device implements the supported behavior using at least one of metering, packet fragmentation, packet reassembly, header insertion or removal, NAT and cryptography.

7. The medium of claim 1 wherein the abstract candidate device model received from the controller describes a parse tree, one or more abstract tables and their desired characteristics and lookups or transforms to be performed in a datapath.

8. The medium of claim 1 wherein the HAL includes a run time translator.

9. The medium of claim 1, wherein the instructions, when executed by the one or more processors, cause the target computing device to:
   send, with the response to the controller, a proposed implementation of the abstract candidate device model;
   receive, from the controller responsive to the response, an acknowledgment agreeing to the proposed implementation; and
   implement the supported behavior from the abstract candidate device model on the target computing device responsive to receiving the acknowledgment using the proposed implementation.

10. The medium of claim 1, wherein the instructions, when executed by the one or more processors, cause the target computing device to:
    send, with the response to the controller, a first proposed implementation of the abstract candidate device model;
    receive, from the controller responsive to the response, a counter-proposal with additional behaviors based on the response;
    send, to the controller, a second response with a second proposed implementation of the abstract candidate device model and the additional behaviors;
    receive, from the controller responsive to the second response, an acknowledgment agreeing to the second proposed implementation; and implement the second proposed implementation on the target computing device responsive to receiving the acknowledgment using the second proposed implementation.

11. A method for implementing an abstract candidate device model specifying forwarding or switching behavior on a target computing device, comprising:
receiving, from a controller, by a Hardware Abstraction Layer (HAL) for the target computing device, an abstract candidate device model describing intended packet forwarding or switching behavior for the target computing device;
mapping, by the HAL, the abstract candidate device model to an existing architecture of the target computing device, the architecture of the target computing device including at least one of an Application Specific Integrated Circuit (ASIC), Field Programmable Gate Array (FPGA), Application Specific Instruction Set Processor (ASIP), Complex Programmable Logic Device (CPLD), graphics processing unit (GPU), processor or microprocessor;
determining, by the HAL, which of the intended packet forwarding or switching behavior is supported by the target computing device;
sending a response to the controller indicating what behavior is supported by the target computing device; and
implementing the supported behavior from the abstract candidate device model on the target computing device.

12. The method of claim 11 wherein the target computing device is a switch.

13. The method of claim 11 wherein the implementation of the supported behavior assigns handles to vector tables on the target computing device so that the vector tables are programmable by the controller at runtime.

14. The method of claim 11 wherein the target computing device implements the supported behavior using parallelism.

15. The method of claim 11 wherein the target computing device implements the supported behavior using pipeline re-ordering.

16. The method of claim 11 wherein the target computing device implements the supported behavior using at least one of metering, packet fragmentation, packet reassembly, NAT and cryptography.

17. The method of claim 11 wherein the abstract candidate device model received from the controller describes a parse tree, one or more abstract tables and their desired characteristics and any lookups or transforms to be performed in a datapath.

18. The method of claim 11, wherein the HAL includes a run time translator.

19. The method of claim 11, comprising:
sending, with the response to the controller, a proposed implementation of the abstract candidate device model;
receiving, from the controller responsive to the response, an acknowledgment agreeing to the proposed implementation; and
implementing the supported behavior from the abstract candidate device model on the target computing device responsive to receiving the acknowledgment using the proposed implementation.

20. The method of claim 11, wherein the instructions, when executed by the one or more processors, cause the target computing device to:
sending, with the response to the controller, a first proposed implementation of the abstract candidate device model;
receiving, from the controller responsive to the response, a counter-proposal with additional behaviors based on the response;
sending, to the controller, a second response with a second proposed implementation of the abstract candidate device model and the additional behaviors;
receiving, from the controller responsive to the second response, an acknowledgment agreeing to the second proposed implementation; and
implementing the second proposed implementation on the target computing device responsive to receiving the acknowledgment using the second proposed implementation.

21. A target computing device with forwarding and switching capability, comprising:
a Hardware Abstraction Layer (HAL); and
a local Application Specific Integrated Circuit (ASIC);
wherein the target computing device is configured to:
receive, by the HAL, from a controller, an abstract candidate device model describing intended packet forwarding or switching behavior for the target computing device;
map, by the HAL, the abstract candidate device model to an existing architecture of the target computing device, including the architecture of the ASIC, and determine which of the intended packet forwarding or switching behavior is supported by the target computing device;
send a response to the controller indicating what behavior is supported by the target computing device; and
implement the supported behavior from the abstract candidate device model on the target computing device.

22. The target computing device of claim 21 wherein the target computing device is a switch.

23. The target computing device of claim 21, wherein the target computing device is configured to assign handles to vector tables on the target computing device so that the vector tables are programmable by the controller at runtime.

24. The target computing device of claim 21, wherein the abstract candidate device model received from the controller describes a parse tree, one or more abstract tables and their desired characteristics, and any lookups or transforms to be performed in a datapath.

25. The target computing device of claim 21, wherein the target computing device is configured to:
send, with the response to the controller, a proposed implementation of the abstract candidate device model;
receive, from the controller responsive to the response, an acknowledgment agreeing to the proposed implementation; and
implement the supported behavior from the abstract candidate device model on the target computing device responsive to receiving the acknowledgment using the proposed implementation.

26. The target computing device of claim 21, wherein the target computing device is configured to:
send, with the response to the controller, a first proposed implementation of the abstract candidate device model;
receive, from the controller responsive to the response, a counter-proposal with additional behaviors based on the response;
send, to the controller, a second response with a second proposed implementation of the abstract candidate device model and the additional behaviors;
receive, from the controller responsive to the second response, an acknowledgment agreeing to the second proposed implementation; and implement the second proposed implementation on the target computing device responsive to receiving the acknowledgment using the second proposed implementation.

\* \* \* \* \*